(12) United States Patent
Schwalbe

(10) Patent No.: US 6,267,534 B1
(45) Date of Patent: Jul. 31, 2001

(54) METHOD AND DEVICE FOR DECONTAMINATION OF GROUND

(75) Inventor: Pontus Schwalbe, Lidingö (SE)

(73) Assignee: Globe Water AB, Stockholm (SE)

( * ) Notice: Subject to any disclaimer, the term of this patent is extended or adjusted under 35 U.S.C. 154(b) by 0 days.

(21) Appl. No.: 09/423,452

(22) PCT Filed: May 8, 1998

(86) PCT No.: PCT/SE98/00845

§ 371 Date: Nov. 22, 1999

§ 102(e) Date: Nov. 22, 1999

(87) PCT Pub. No.: WO98/51421

PCT Pub. Date: Nov. 19, 1998

(30) Foreign Application Priority Data

May 13, 1997 (SE) .................................................. 9701809

(51) Int. Cl.⁷ .................................................. E02D 3/00
(52) U.S. Cl. .................. 405/128.45; 405/128.5; 405/128.7; 405/128.75
(58) Field of Search .................. 405/128, 129, 405/258, 263, 264

(56) References Cited

U.S. PATENT DOCUMENTS

| | | | |
|---|---|---|---|
| 4,842,448 | * 6/1989 | Koerner et al. ...................... | 405/258 |
| 5,043,076 | * 8/1991 | Alexander ............................. | 405/128 |
| 5,067,852 | * 11/1991 | Plunkett ................................. | 405/128 |
| 5,106,232 | 4/1992 | Metzer et al. . | |
| 5,150,988 | * 9/1992 | Powell et al. ........................ | 405/258 |
| 5,263,795 | * 11/1993 | Corey et al. .......................... | 405/128 |
| 5,595,458 | * 1/1997 | Grabhorn .............................. | 405/258 |
| 5,733,067 | * 3/1998 | Hunt et al. ............................ | 405/128 |
| 5,803,174 | * 9/1998 | Gilmore et al. ...................... | 405/264 |
| 6,102,621 | * 8/2000 | Siegrist et al. ....................... | 405/128 |

OTHER PUBLICATIONS

Chemical Abstracts, vol. 124, No. 16, c. 1997 American Chemical Society.

* cited by examiner

*Primary Examiner*—David Bagnell
*Assistant Examiner*—Frederick L. Lagman
(74) *Attorney, Agent, or Firm*—Dowell & Dowell, P.C.

(57) ABSTRACT

A method and a device for decontaminating soil on the spot from harmful substances. In the soil one or several horizontally drilled holes (10) are arranged debouching into the ground surface. In the hole a chord (16) is inserted in form of a hose or a number of interconnected sockets, in which reactive sorbents are stored. The chord (16) remains in the ground during a sufficiently long period for achieving a desired decontamination of the soil.

14 Claims, 1 Drawing Sheet

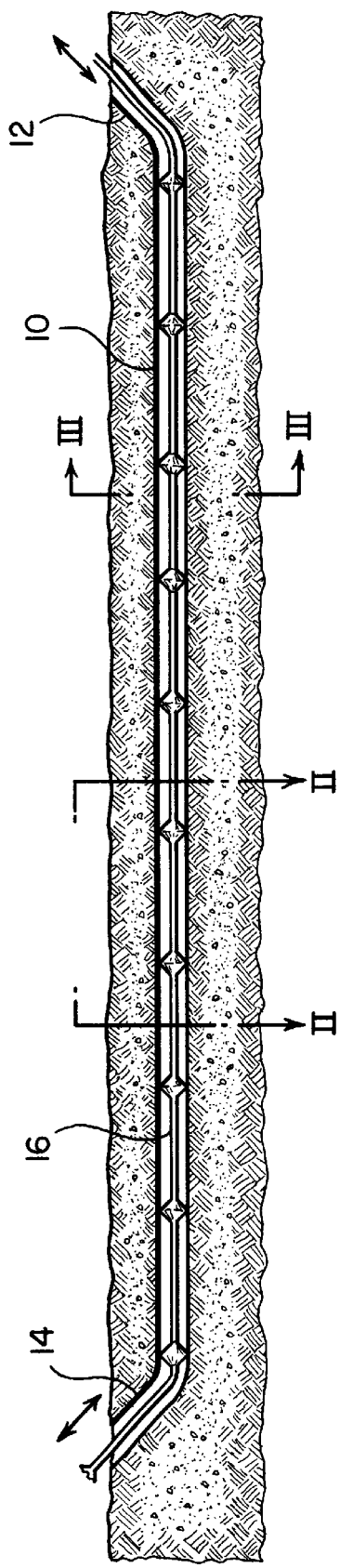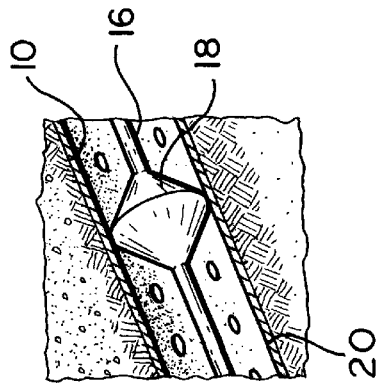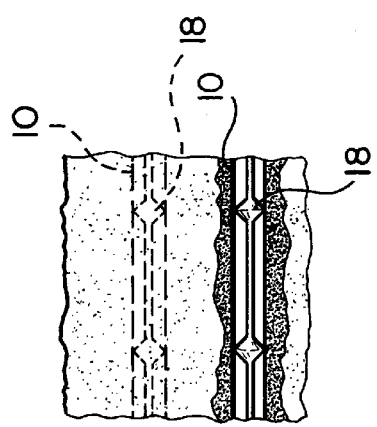

METHOD AND DEVICE FOR DECONTAMINATION OF GROUND

BACKGROUND OF THE INVENTION

1. Field of the Invention

The present invention relates to a method for decontaminating soil on the spot from harmful substances. The invention also relates to a device to accomplish the method.

2. Description of the Related Art

There are today over the world existing large areas with contaminationed soil. Grounds being contaminated by harmful substances, such as heavy metals, but also PCB, chlorinated hydrocarbons, etc.

Thus, it has become a large field of research to develop technologies to remove poisons from the soil and a number of different methods has been proposed. A method has i.a. been proposed, by which the poisoned soil is removed and transported to decontamination facility, in which the soil is cleaned and thereafter restored to the ground area, where the removal took place. Such a method and the matching device become very complicated and thereby expensive to accomplish, the facility becoming i.a. automatically mobile to be usable in ground areas to be cleaned, or the soil has to be transported to a stationary facility far from the ground area. Also chemical methods have been developed to clean contaminated grounds, microemulsions then being pressed into the ground to wash the decontaminations away from it. Even this last mentioned method becomes complicated due to the aggregates pressing down the microemulsions and pumping these again out of the contaminated ground.

SUMMARY OF THE INVENTION

The main object of the present invention is to present a method for cleaning grounds, in which the drawbacks of already known methods might be avoided and which in a simple and inexpensive way provides a cleaning of contaminated grounds.

Another object of the invention is to provide a device, by means of which contaminated grounds can be cleaned in a simple and inexpensive way.

These and other objects and advantages of the invention are achieved by providing it with the characteristics specified in the claims to follow. In accordance with the invention at least one generally horizontal bore hole is created in the ground which communicates with an opening to the surface of the soil and a chord is inserted within the bore which chord includes reactive sorbents. The chord is retained in the ground for a period of time to allow the sorbents to provide for desired decontamination of the adjacent soil.

The invention will be described herein below more in detail in connection with the drawing, providing an embodiment of a device for accomplishing the method according to the invention.

BRIEF DESCRIPTION OF THE DRAWINGS

FIG. 1 shows a cross section of a ground area to be cleaned

FIG. 2 shows a plane view along the line II—II in FIG. 1.

FIG. 3 shows a section along the line III—III in FIG. 1.

DESCRIPTION OF THE PREFERRED EMBODIMENTS

As shown in FIG. 1 a horizontal hole 10 is drilled in the ground to be cleaned, this being achieved by means of a technology known in the art, a drill being inserted at an angle into the ground at an entrance hole 12 and being drilled horizontally along a distance appropriate for the cleaning and with respect to the equipment adapted to about 100 to 200 meters, before the drill is lifted out of the ground at an exit hole 14. Several such holes 10 are drilled parallel with each other in accordance with FIG. 2 to cover the ground area to be decontaminated in the other direction. The distance between the holes 10 in this other direction might be of the order of 1 of 3 meters, e.g. 2 meters, depending on the circumstances in the contaminated ground to be cleaned.

According to the invention a chord 16 of an appropriate material, such as a plastic material, is inserted in the drilled holes, the chord 16 connecting a multitude of, at appropriate intermediate intervals, spaced sockets 18 for a sorbent. The sockets 19 consist of a material letting liquid pass into and out of the socket, such as a net material with meshes of a magnitude to retain sorbent particles in the socket 18. The distance between the sockets 18 on the chord 16 is a function of the type of sorbent and the conditions of the poisoned soil to be cleaned, the distance being such that the sorbent in two neighbouring sockets 18 are operating on the itermediate ground surface both in the longitudinal and the transverse direction. If it is necessary to reinforce the hole 10 and to facilitate the insertion of the chord 16, the hole might be lined with a slotted or perforated hose or liner 20 having openings 22, as shown in FIG. 3.

Instead of the embodiments here shown in might be envisaged that the chord 16 itself consists of a hose with fine meshes containing the sorbent, eventually with compressed portions in the hose in appropriate spaces to keep the sorbent equally distributed in the hose. In this case the socket 18 might be abolished.

Zeolites with a chrystalline structure might be used as a sorbent provided in the sockets 18 providing a large absorption capacity and thus absorbing large quantities of different kinds of materials, such as heavy metals and other harmful substances. The absorption is achieved in that the soil is moist and in most cases the moisture of the soil itself will be sufficient for the desired effect, but water might be added if this is desirable so that the ground is moistened at the drilled holes. When the chords of the sorbent sockets have been lying under the ground for a sufficiently long period to achieve the desired cleaning or decontamination of the soil, the chord is retracted out of the hole and the employed sorbent can be regenerated for a new application for a decontamination of further areas.

From the description above it is evident that a very simple and inexpensive method has been provided to decontaminate large areas of poisoned soils on site without and handling of the soil itself being necessary.

Obviously, the embodiment shown above represents merely an example of the implementation of the invention and changes might be made without leaving the scope of the invention. Thus, the sockets 18 can have another form than that already shown, e.g. having a spherical or longitudinal shape arranged with larger or smaller intermediate spaces or consisting, as stated above, of a single hose, eventually compressed in equal intermediate spaces.

The sorbent might also be another one than zeolite, depending on the type of contamination to be removed from the ground.

What is claimed is:

1. A method of decontaminating soil on site from at least one harmful substance including, drilling at least one generally horizontal bore hole in the soil which communicates with at least one access hole which extends to a surface of the soil, inserting a chord member containing at least one reactive sorbent of a type having a capacity to remove at least one harmful substance from the soil, and retaining the chord member within the at least bore hole for a period of time sufficient to achieve a desired decontamination of the at least one harmful substance from the soil.

2. The method of claim 1 including forming the chord member in a form of a number of interlinked and spaced sockets in which the at least one sorbent is retained.

3. The method of claim 2 including forming the sockets of a net-like material in which the at least one sorbent is retained.

4. The method of claim 1 including forming the chord member in a hose structure with a net-like material in which the at least one sorbent is retained.

5. The method of claim 1 including inserting a liner having openings therethrough within the at least one bore hole and thereafter inserting the chord member within the liner.

6. The method of claim 1 in which the at least one sorbent includes a zeolite.

7. The method of claim 1 including moistening the soil in an area of the at least one bore hole.

8. The method of claim 1 including removing the chord member from the at least one bore hole after the desired decontamination is achieved and regenerating the at least one reactive sorbent.

9. A device for decontaminating soil on site by removing at least one harmful substance from the soil, the device comprising a chord member in which at least one sorbent material of a type having a capacity to remove the at least one harmful substance from the soil is contained, said chord member being of a configuration so as to be adaptable to be received within an elongated bore hole provided in the soil.

10. The device of claim 9 in which said chord member includes a plurality of spaced sockets, said at least one reactive sorbent being contained within said sockets.

11. The device of claim 10 in which said sockets are constructed of a net-like material having a mesh size smaller than a particle size of the sorbent.

12. The device of claim 9 in which said chord member is in a form of a hose.

13. The device of claim 12 in which said hose is constructed of a net-like material having a mesh size smaller than a particle size of the sorbent.

14. The device of claim 9 including a liner member of a size to receive said chord member therein, said liner member including a plurality of openings.

* * * * *